(12) United States Patent
Buchwald

(10) Patent No.: US 8,602,362 B2
(45) Date of Patent: Dec. 10, 2013

(54) SYSTEM AND METHOD FOR SCAVENGING ULLAGE FROM CENTER WING TANKS IN AN AIRPLANE

(75) Inventor: Philip Paul Buchwald, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 452 days.

(21) Appl. No.: 12/900,752

(22) Filed: Oct. 8, 2010

(65) Prior Publication Data

US 2012/0087807 A1    Apr. 12, 2012

(51) Int. Cl.
    *B64D 37/04*    (2006.01)
(52) U.S. Cl.
    USPC .................. 244/135 R; 417/54; 220/88.3
(58) Field of Classification Search
    USPC .......... 244/135 R; 137/209, 1; 220/88.3, 883; 417/54, 65
    See application file for complete search history.

(56) References Cited

U.S. PATENT DOCUMENTS

| | | | |
|---|---|---|---|
| 3,710,549 A * | 1/1973 | Nichols et al. | 261/36.1 |
| 7,152,635 B2 * | 12/2006 | Moravec et al. | 141/64 |
| 7,176,398 B2 | 2/2007 | Buchwald et al. | |
| 7,459,081 B2 | 12/2008 | Koenig et al. | |
| 7,694,916 B2 | 4/2010 | Limaye et al. | |
| 2006/0174845 A1 * | 8/2006 | Thoma | 122/26 |
| 2008/0099618 A1 * | 5/2008 | Zaki et al. | 244/135 R |
| 2010/0104910 A1 * | 4/2010 | Devoe et al. | 429/26 |

* cited by examiner

*Primary Examiner* — Christopher P Ellis
*Assistant Examiner* — Medhat Badawi
(74) *Attorney, Agent, or Firm* — Edwards Wildman Palmer LLP; Scott D. Wofsy; George N. Chaclas

(57) ABSTRACT

A system for reducing reactive components in ullage of a fuel tank, typically the fuel tank of an airplane. The system includes an air driven unit for creating a fluidic motive force to remove ullage from the fuel tank, and a main catalytic unit for receiving the ullage and reducing the reactive components to yield processed ullage for return to the fuel tank.

16 Claims, 4 Drawing Sheets

US 8,602,362 B2

SYSTEM AND METHOD FOR SCAVENGING ULLAGE FROM CENTER WING TANKS IN AN AIRPLANE

BACKGROUND OF THE DISCLOSURE

1. Field of the Disclosure

The subject disclosure relates to systems for scavenging ullage from center wing tanks (CWT) in an airplane, and more particularly to an improved system for scavenging the ullage, then reducing the levels of reactive components, and returning the resulting inert air to the ullage space of the CWT.

2. Background of the Related Art

Center wing tanks (CWT) are used to hold fuel for airplanes. Although airplanes run on liquid fuel, the CWT generally contain some amount of air known as ullage. During long flights, for example, a large amount of fuel is consumed to create space in the CWT filled by ullage. If left alone, the ullage would not only be a gas rich in fuel vapors but include ample oxygen present in the ambient ullage air intake flow. When the ullage contains these reactive components (e.g., oxygen and/or fuel vapors), fires and explosions become possible.

To alleviate the hazards associated with ullage, some systems have been developed to fill the ullage space of the emptying tank with nitrogen rich air or an otherwise inert gas. Typically, electrically powered air pumps circulate the replacement air into the ullage space. Several techniques have also been developed to remove the reactive components from the ullage. For example, U.S. Pat. No. 7,694,916 to Limaye et al. (the '916 patent), issued on Apr. 13, 2010 and incorporated herein by reference, shows a catalytic reactive component for reducing reactive components.

SUMMARY OF THE INVENTION

There are problems associated with prior art systems that address safety concerns associated with ullage in CWT of airplanes.

The systems that utilize electrically powered air pumps have impractically high power consumption for an on-board aircraft system. In one embodiment, the subject technology provides air flow with little or no power consumption to overcome this disadvantage. Further, electrically powered air pumps may break down creating an unreliable system. The subject technology may be deployed with minimal moving parts and, thus, greatly improved reliability.

Systems that utilize catalytic components to remove reactive components require pre-heating or waiting until operative temperature is reached. It is another teaching of the subject technology to provide pre-heating for catalytic components or otherwise simplify the components to bring the catalytic components to operative temperature.

In one embodiment, the present technology is directed to a method for reducing reactive components in ullage of a fuel tank. The method includes the steps of using ram air to create a fluidic motive force, applying the fluidic motive force to the fuel tank to remove ullage, providing the removed ullage to a main catalytic unit for reducing the reactive components to yield processed ullage, and returning the processed ullage to the fuel tank. The method may also include powering a pump with the ram air to create the fluidic motive force, wherein the steps of providing and returning also utilize the fluidic motive force.

The method may also further include the step of providing the removed ullage to a secondary catalytic unit to create heated ullage for the main catalytic unit, wherein the secondary catalytic unit is relatively smaller than the main catalytic unit. The method may also remove heat from the processed ullage. The method may also use the ram air to cool the catalyst and the ullage. Typically, the fuel tank is a center wing tank of an airplane.

In another embodiment, the subject technology is directed to a system for reducing reactive components in ullage of a fuel tank including an air driven unit for creating a fluidic motive force to remove ullage from the fuel tank and a main catalytic unit for receiving the ullage and reducing the reactive components to yield processed ullage for return to the fuel tank. The system may also include a heat exchanger for removing heat from the processed ullage, and/or a secondary heat exchanger cooled by ram air.

Typically, the fuel tank is a center wing tank of an airplane and airplane engine bleed air is used to power the air driven unit and pre-heat the main catalytic unit. A valve preferably operates to selectively provide the airplane engine bleed air to the main catalytic unit. In one embodiment, a secondary catalytic unit creates heated ullage for the main catalytic unit, wherein the secondary catalytic unit is relatively smaller than the main catalytic unit. If beneficial, an orifice can restrict ullage flow to the secondary catalytic unit.

Still another embodiment of the subject technology is directed to a method for reducing reactive components in ullage of a fuel tank including the steps of using engine bleed air to create a fluidic motive force, applying the fluidic motive force to the fuel tank to remove ullage, providing the removed ullage to a main catalyst for reducing the reactive components to yield processed ullage, and returning the processed ullage to the fuel tank.

It should be appreciated that the present technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
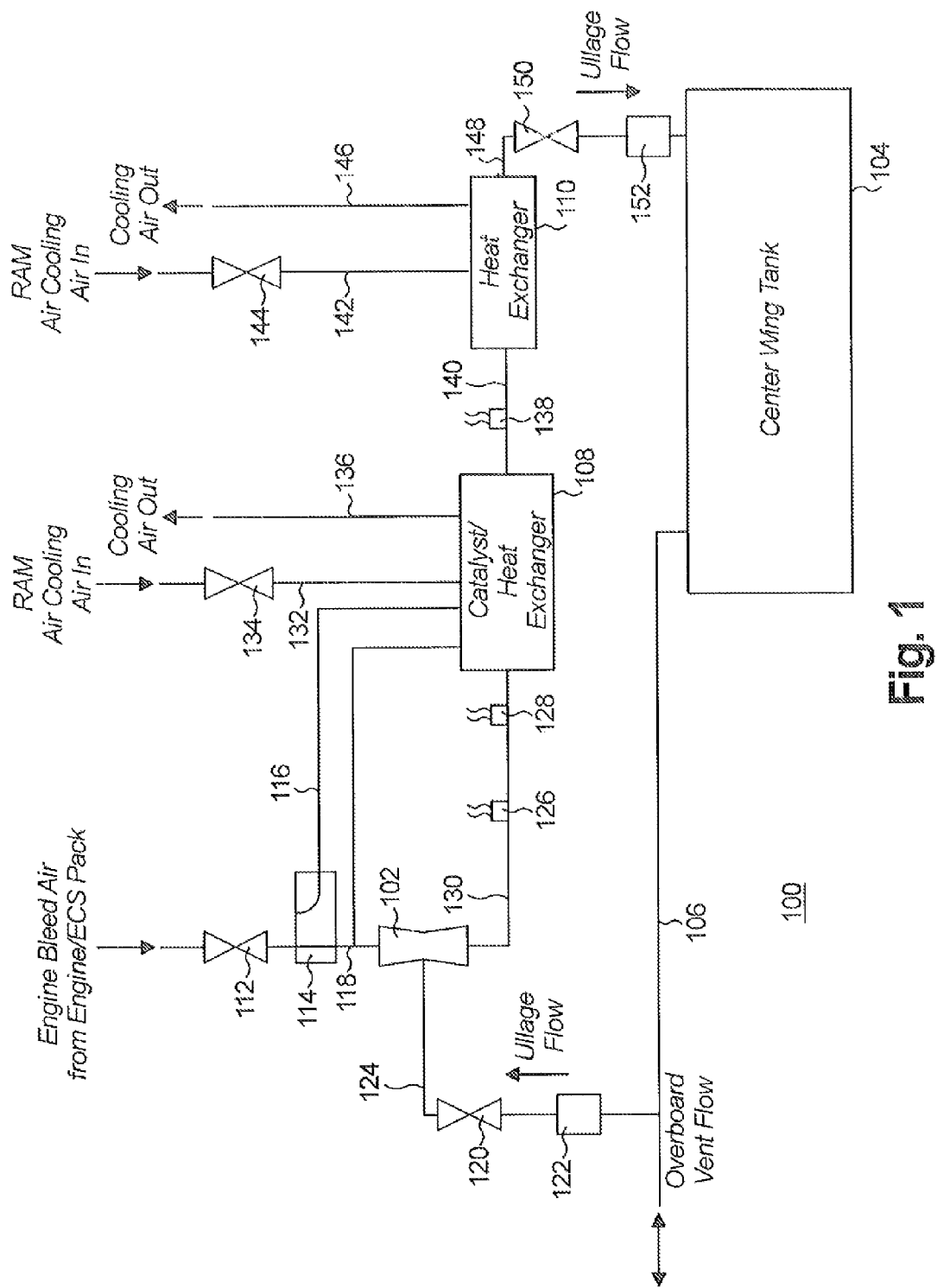
FIG. 1 is a schematic view of a system for scavenging and returning ullage to center wing tanks in an airplane using an ejector venturi for scavenging ullage and ram air for cooling in accordance with the subject technology.

The present disclosure overcomes many of the prior art problems associated with circulating ullage for removing reactive components. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

For clarity common items such as valve control mechanisms, connectors and the like have not been included in the Figures as would be appreciated by those of ordinary skill in the pertinent art. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the Figures are schematic such that the shapes and sizes of components can vary without materially affecting or limiting the disclosed technology.

Now referring to FIG. 1, a schematic view of a system for scavenging and returning ullage to center wing tanks in an airplane is shown and referred to generally by the reference numeral 100. In brief overview, the system 100 uses an ejector venturi 102 and engine bleed air from the engine/ECS pack to scavenge ullage from a center wing tank (CWT) 104. The engine bleed air (also known as ECS system compressed air) is expanded across the ejector venturi 102 to draw the ullage from overboard vent plumbing 106 of the CWT 104. The scavenged ullage is directed to a catalyst/heat exchanger 108 such as shown in the '916 patent. The oxygen in both the ullage and the expanded engine bleed air is consumed by the catalyst/heat exchanger 108 while consuming the fuel vapor present in the ullage. The oxygen and fuel vapor depleted air is then passed through a second heat exchanger 110 and delivered back to the CWT 104.

The system 100 includes a flow control valve 112 for controlling delivery of the engine bleed air to the ejector venturi 102. The temperature of the output of the catalyst/heat exchanger 108 is monitored by a temperature sensor 138 in plumbing line 140, which is connected to the second heat exchanger 110. If the temperature at sensor 138 is still too high, the flow control valve 112 can be used to reduce the flow of engine bleed air into the ejector venturi 102, which reduces the ullage draw and, in turn, decreases the heat generated by the catalytic reaction.

The system 100 also includes a diverter valve 114 intermediate the flow control valve 112 and ejector venturi 102 so that hot engine bleed air may be selectively directly fed to the catalyst/heat exchanger 108 via line 116 for pre-heating the catalyst/heat exchanger 108. The diverter valve 114 can alternatively direct the engine bleed air into the ejector venturi 102 through input line 118. An isolation valve 120 and flame arrestor 122 are intermediate the ejector venturi 102 and overboard vent plumbing 106, which allows the ejector venturi 102 to be fed ullage from the CWT 104 via input line 124.

Still referring to FIG. 1, the system 100 also includes an oxygen sensor 126 and a temperature sensor 128 in the output line 130 of the ejector venturi 102. The output line 130 provides the mixed ullage to the catalyst/heat exchanger 108 as will be described in more detail below. Ram air is also selectively provided to the catalyst/heat exchanger 108 for cooling via line 132 when a flow control valve 134 is open. The ram cooling air exits the catalyst/heat exchanger 108 via line 136.

The second heat exchanger 110 also selectively receives ram air for cooling via line 142 when a respective flow control valve 144 is open. The ram cooling air exits the second heat exchanger 110 through plumbing line 146. The output of the second heat exchanger 110 flows into the CWT through line 148 to provide ullage flow that has little or no reactive components. Another isolation valve 150 is provided in line 148 to prevent back up flow as well as a flame arrestor 152.

In Operation

Still referring to FIG. 1, upon initial startup of the system 100, it is possible for fresh air to be drawn into the ejector venturi 102 from the overboard vent plumbing 106. However, the general flow of ullage is outward from the CWT 104 into the overboard vent plumbing 106 because expanded engine bleed air is fed into the CWT 104.

To accomplish feeding the engine bleed air into the CWT 104, the flow control valve 112 opens and pre-heat diverter valve 114 sends the flow therefrom into the catalyst/heat exchanger 108. Except at ground idle throttle conditions with low ambient temperatures, the engine bleed air temperature is in excess of 350° F. As the engine bleed air is hot, the catalyst/heat exchanger 108 is beneficially warned, preferably to a sufficient operating temperature to alleviate the need for a separate electric heater element. If needed, an electrical heater can provide additional pre-heating of the catalyst/heat exchanger 108. In an alternative embodiment, the hot engine bleed air passes through the catalyst/heat exchanger 108 in a closed circuit without mixing with the ullage flow therein.

After passing through the catalyst/heat exchanger 108, the engine bleed air then passes through the second heat exchanger 110 and into the CWT 104. Hence, ullage is forced into the overboard vent plumbing 106 towards the ejector venturi 102 with minimal flesh air drawn into the system 100. Once flow is established into the CWT 104, fuel-rich ullage is the only flow that is available to the ejector venturi 102 from the overboard vent plumbing 106.

Once the catalyst/heat exchanger 108 is at operating temperature as indicated by the temperature sensor 138, the pre-heat diverter valve 114 directs the engine bleed air into the ejector venturi 102 and flow stops in the pre-heat line 116. It is envisioned that the total heat flow into the catalyst/heat exchanger 108 remains constant whether the pre-heat diverter valve 114 is open or closed. Hence, in another embodiment, the pre-heat diverter valve 114 is eliminated to allow the engine bleed air to flow through the catalyst preheat circuit at all times during operation of the system 100. Localized hot or cold spots and the like in various configurations could affect the requirement for preheat air or electric heater elements during start up and steady state operation.

In the ejector venturi 102, sufficient mixing of the bleed air and ullage occurs so that the resulting mixed ullage has a sufficient fuel concentration to react in the catalyst chamber. The oxygen contained in the expanded engine bleed air is consumed in the catalyst/heat exchanger 108 as well. The mixed ullage provides sufficient fuel vapor to make the catalyst/heat exchanger 108 function.

In applications where the ullage has a safety guideline oxygen level, the oxygen level of the mixed ullage falls to satisfactorily low levels before the fuel vapor in the ullage is depleted by the catalyst/heat exchanger 108. Preferably, the catalyst/heat exchanger 108 works satisfactorily with an approximate 1% fuel to air ratio. During steady state operation, the flow control valves 134, 144 open to allow ram air as a cooling source for the catalyst/heat exchanger 108 and second heat exchanger 110, respectively. Ram air for cooling is used widely in oxygen filter ullage applications so that regulatory issues may be easily overcome by use of ram air in a different, non-obvious application such as the present technology.

If the temperature as monitored by the temperature sensor 138 becomes unsafely high, the flow control valve 112 can throttle down delivery of the engine bleed air to the ejector venturi 102. As a result, the ullage draw is reduced and, in turn, the heat generated by the catalytic reaction to further lower the temperature.

Second Embodiment

Figure 2:
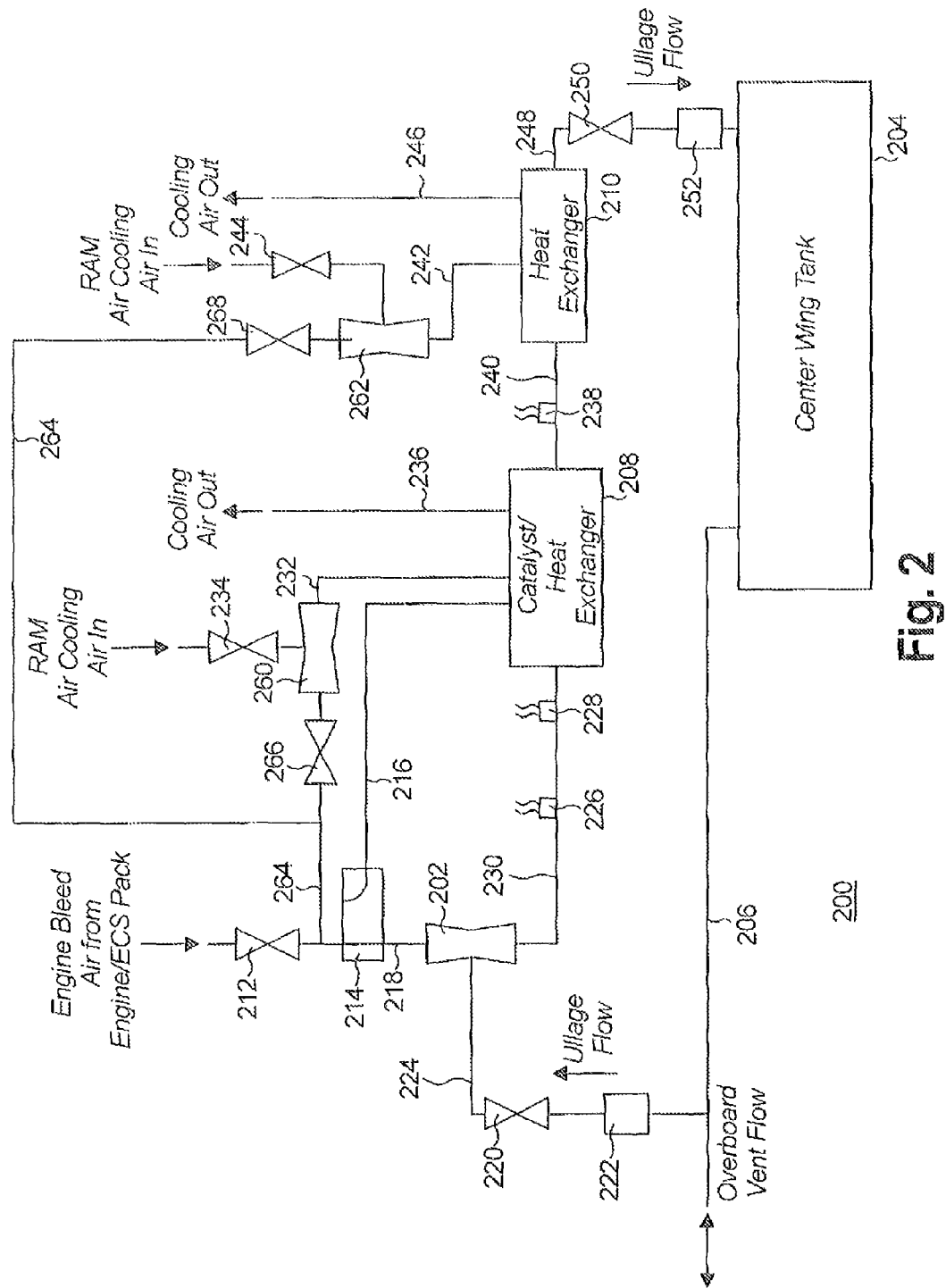
FIG. 2 is a schematic view of a system for scavenging and returning ullage to center wing tanks in an airplane using ejector venturis for scavenging ullage and providing catalytic cooling in accordance with the subject technology.

Referring now to FIG. 2, a schematic view of another system for scavenging and returning ullage to center wing tanks in an airplane is shown. As will be appreciated by those of ordinary skill in the pertinent art, the system 200 utilizes similar principles to the system 100 described above. Accordingly, like reference numerals preceded by the numeral "2" instead of the numeral "1", are used to indicate like elements. The following description is directed primarily to the differences of the system 200 in comparison to the system 100, namely using engine bleed air through additional ejector venturis 260, 262 to provide additional catalytic cooling during ground operations.

Compared to prior art systems, the subject technology requires relatively less engine bleed air. Consequently, the remaining available bleed air can be advantageously used elsewhere in the system 200 for cooling the catalyst/heat exchanger 208 and second heat exchanger 210. A benefit of this method is that cooling air is available during ground operations when ram air may be reduced or not available because the engines and/or auxiliary power units (APU) are running.

To accomplish the additional cooling, an additional plumbing line 264 connects to line 218 carrying the engine bleed air. It is noted that the engine bleed air may be from the engines, the APU, or a combination thereof. The additional plumbing line 264 splits to provide the engine bleed air into the additional ejector venturis 260, 262. Bleed valves 266, 268 are connected before the ejector venturis 260, 262, respectively, for siphoning air from lines 264. During flight when ram air is available, ejector venturi 260 also receives ram air from the flow control valve 234 and sends an output into line 232, which connects to the catalyst/heat exchanger 208. Similarly, the second additional ejector venturi 262 receives engine bleed air from line 264 and ram air from the flow control valve 244.

During ground operations, the engine bleed air cools the catalyst/heat exchanger 208 and heat exchanger 210. During cruising and anti-ice bleed off, the ram air pressure is significantly increased, which results in greater efficiencies. Hence, during flight, the engine bleed air cooling for the heat exchangers 208, 210 can be shut off.

As can be seen, the subject technology uses engine bleed air to provide motive power to move ullage from the aircraft CWT to the catalyst/heat exchanger(s) in inerting systems. As a result, the inerting systems eliminate electrically powered air pumps which have impractically high power consumption for an on-board aircraft system. The engine bleed air being used to pre-heat the catalyst removes the need for an electric heater, which further reduces the electrical power requirements of the inerting system. Thus, the inerting systems of the subject technology have little or no electrical power requirements as well as a smaller volume/envelope requirement because ejectors have a smaller envelope that air pumps or fans with electric motors. Still further, the subject technology reduces the number of moving parts, so reliability is improved.

Third Embodiment

Figure 3:
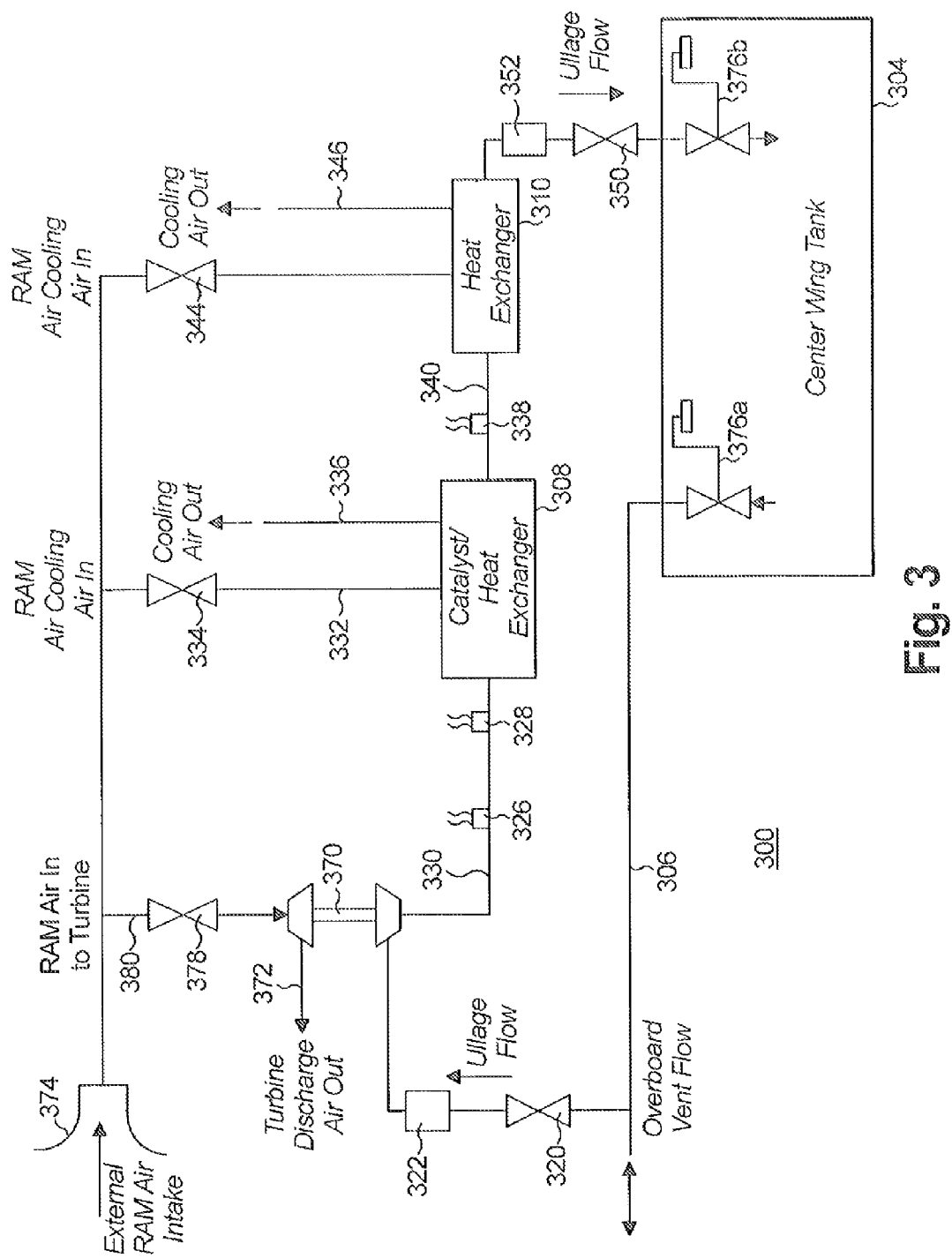
FIG. 3 is a schematic view of a system for scavenging and returning ullage to center wing tanks in an airplane using only ram air as the motive force to circulate the ullage in accordance with the subject technology.

Turning to FIG. 3, another embodiment of an inerting system is indicated generally by the reference numeral 300. The inerting system 300 is similar to the inerting systems 100, 200 described above, and therefore like reference numerals preceded by the numeral "3" instead of the numeral "1" or "2", respectively, are used to indicate like elements. The primary difference of the inerting system 300 in comparison to the systems 100, 200 is that the system 300 uses only ram air as the motive force to circulate the ullage. The following description is directed primarily to the differences of the system 300 in comparison to the systems 100, 200 for brevity.

Ram air is used to power a turbine (not shown explicitly), which in turn powers an air pump 370 to provide the motive force for ullage flow. The ram air comes from an air intake 374 and the turbine exhaust discharges through line 372. Preferably, the air intake 374 is a scoop which projects into the external airstream. Various types of valves (not shown) may be used with the scoop to selectively open and close the scoop and, thereby, open and close the ram air flow as is known to those of ordinary skill in the art. The system 300 uses the catalyst/heat exchanger 308 and heat exchanger 310 as a cooling source again. The cooling flow for both the catalyst/heat exchanger 308 and the secondary heat exchanger 310 is also provided by ram air.

The force created by the turbine powered pump 370 draws or scavenges the ullage air from the CWT 304 via the overboard vent plumbing line 306. As noted above, the ullage is directed to the catalyst/heat exchanger 308 where the oxygen in the ullage is consumed using ullage fuel vapor. The oxygen depleted ullage is passed through the second heat exchanger 310 for further removal of heat and delivered back to the CWT 304.

For safety, the temperature of the ullage preferably should not exceed 390° F. Although a portion of the ram air is used to cool the oxygen depleted ullage in the catalyst/heat exchangers 308, 310, reduction of the ullage flow and, in turn, reduced heat produced by the catalyst 308 can also be used to control temperature. For this purpose, a flow control valve 378 is provided in the intake line 380 to the turbine powered pump 370.

The temperature of the ullage is monitored by the temperature sensor 308 upon exiting the catalyst/heat exchanger 308. To maintain the temperatures at or below a predetermined safety limit, the ullage flow is throttled by the flow control valve 378 in addition to the usage of the heat exchangers 308, 310. Throttling down the flow control valve 378 decreases oxygen due and, thereby, the rate at which the catalyzed reaction occurs to decrease the ullage exit temperature.

Two float valves 376a, 376b are provided in the CWT 304 but may be placed elsewhere in the system 300. The float valves 376a, 376b act as shutoff valves to prevent liquid fuel from spilling overboard or into the ullage flow pipes, in the case where the fuel tank is over-filled during refueling, or if aircraft attitude (for instance, in a steep dive) would result in the fuel flowing into the ullage piping and the like.

As can be seen from the description above, the inerting system 300 has several advantages. The system 300 has no electrical power requirements except for control sensors and logic devices to operate the system 300. The system 300 also has a smaller volume/envelope requirement.

Fourth Embodiment

Figure 4:
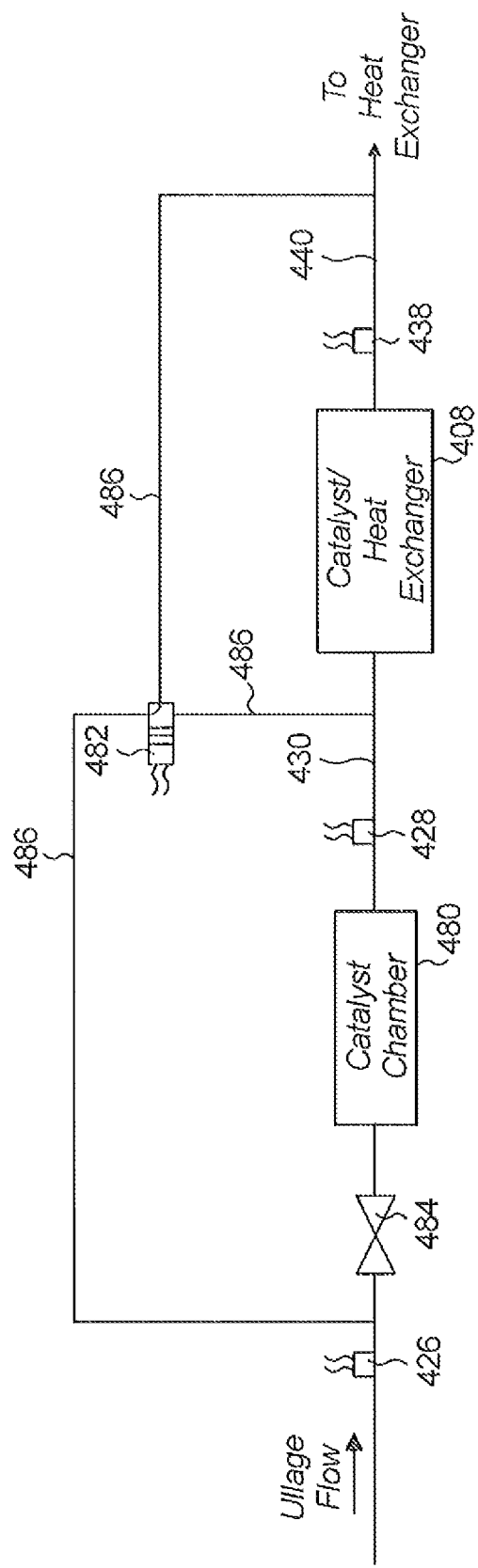
FIG. 4 is a schematic view of a portion of a system for scavenging and returning ullage to center wing tanks in an airplane using a small catalytic pre-heat chamber for providing heat to a larger catalyst/heat exchanger in accordance with the subject technology.

Referring now to FIG. 4, a portion of another embodiment for configuring a catalyst/heat exchanger 408 for use in an ullage inerting system is indicated generally by the reference numeral 400. As the inerting system 400 is similar to the inerting systems 100, 200, 300 described above, only a portion of the system 400 is shown. Like reference numerals preceded by the numeral "4" instead of the numeral "1", "2" or "3", respectively, are used to indicate like elements. The primary difference of the inerting system 400 is a small catalytic pre-heat chamber 480, which provides heat to the catalyst/heat exchanger 408 instead of electrical or engine bleed air pre-heating of the catalyst/heat exchanger 408. As a result, start up power requirements are reduced and the absorption of hydrocarbons from the ullage into the catalytic material in the catalyst/heat exchanger 408 is avoided.

It has been determined that allowing ullage to come in contact with the catalytic material while the catalytic material is cold will cause the hydrocarbons to be absorbed out of the ullage and into the catalytic material. Then, upon heating of the catalytic material, the absorbed hydrocarbons react to overheat and damage the catalytic material. The inerting system 400 includes a bypass valve 482 in a bypass line 486 which does not allow the ullage to flow through the catalyst/heat exchanger 408 before the catalyst/heat exchanger 408 is heated to operating temperature.

To bring the catalyst/heat exchanger 408 up to temperature, the relatively smaller catalytic pre-heat chamber 480 is provided. The catalytic pre-heat chamber 480 includes an electric heater (not explicitly shown) in order to reach operating temperature. Although the pre-heat chamber 480 still requires an electric heater, the heat requirement is smaller and, in turn, the power requirement is smaller. A restrictor orifice 484 is connected before the pre-heat chamber 480 for limiting the amount of flow through the preheat chamber 480. Because the surface area of the catalyst within the catalyst/heat exchanger 408 is small, it is desirable to restrict the ullage flow across the catalyst to keep the catalyst from overheating and burning out. The restrictor orifice 484 is sized so that a majority of the ullage is simply bypassed back to the CWT (not shown) during the preheat cycle. When the valve 482 shuttles and redirects the flow to the main catalyst chamber in the catalyst/heat exchanger 408, the restrictor orifice 484 then makes sure that the majority of the ullage flow is through the main catalyst chamber.

Once the electric heater has raised the temperature of the pre-heating chamber 480 to the required temperature, ullage is introduced thereto creating more heat as hot exhaust. The hot exhaust from the pre-heat chamber 480 is routed to the catalyst/heat exchanger 408 to raise the temperature thereof to the proper level prior to introducing ullage flow into the catalyst/heat exchanger 408. In view of the above, it can be seen that the catalytic pre-heat chamber 480 and associated bypass valve 482 preclude the possibility of hydrocarbons from the ullage being absorbed by the catalyst/heat exchanger 408.

As would be appreciated by those of ordinary skill in the pertinent art, the subject technology is applicable to use as an inerting system with significant advantages for any system that has ullage. The subject technology is particularly beneficial for aviation applications. However, the subject technology could be applied equally as well to other applications and fields such as fuel cell applications, boats, trains, automobiles, space shuttles and the like. The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., sensors, valves and the like) shown as distinct for purposes of illustration may be incorporated within other functional elements, separated in different hardware or distributed in various ways in a particular implementation. Further, relative size and location are merely somewhat schematic and it is understood that not only the same but many other embodiments could have varying depictions.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A method for reducing reactive components in ullage of a fuel tank, the method comprising the steps of:
    a) using ram air to create a fluidic motive force;
    b) applying the fluidic motive force to the fuel tank to remove ullage;
    c) providing the removed ullage to a main catalytic unit for reducing the reactive components to yield processed ullage by using the fluidic motive force; and
    d) returning the processed ullage to the fuel tank by using the fluidic motive force.

2. A method as recited in claim 1, further comprising the step of removing heat from the processed ullage.

3. A method as recited in claim 1, wherein the fuel tank is a center wing tank of an airplane and further comprising the steps of using the ram air to cool the catalyst and the ullage and powering a pump with the ram air to create the fluidic motive force.

4. A method as recited in claim 1, further comprising the step of providing the removed ullage to a secondary catalytic unit to create heated ullage for the main catalytic unit, wherein the secondary catalytic unit is relatively smaller than the main catalytic unit.

5. A system for reducing reactive components in ullage of a fuel tank comprising:
    an air driven unit for creating a fluidic motive force to remove ullage from the fuel tank;
    a main catalytic unit for receiving the ullage and reducing the reactive components to yield processed ullage for return to the fuel tank;
    a secondary catalytic unit to create heated ullage for the main catalytic unit, wherein the secondary catalytic unit is relatively smaller than the main catalytic unit; and
    a secondary heat exchanger cooled by ram air;
    wherein the fuel tank is a center wing tank of an airplane and airplane ram air is used to drive the air driven unit and cool the processed ullage.

6. A system as recited in claim 5, further comprising a heat exchanger for removing heat from the processed ullage.

7. A system as recited in claim 5, further comprising a flow control valve for controlling delivery of the airplane ram air to the air driven unit.

8. A system as recited in claim 6, wherein the fuel tank is a center wing tank of an airplane and airplane engine bleed air is used to pre-heat the main catalytic unit and further comprising a valve operative to selectively provide the airplane engine bleed air to the main catalytic unit.

9. A system as recited in claim 5, further comprising an orifice to restrict ullage flow to the secondary catalytic unit.

10. A method for reducing reactive components in ullage of a fuel tank, the method comprising the steps of:
   a) using engine bleed air to create a fluidic motive force;
   b) applying the fluidic motive force to the fuel tank to remove ullage;
   c) providing the removed ullage to a main catalyst for reducing the reactive components to yield processed ullage;
   d) returning the processed ullage to the fuel tank;
   e) during ground operations, using engine bleed air to cool the catalyst and, in turn, the ullage; and
   f) during flight, additionally using ram air to cool the catalyst and, in turn, the ullage.

11. A method as recited in claim 10, further comprising the step of removing heat from the processed ullage by passing ram air through at least one heat exchanger.

12. A method as recited in claim 10,
   wherein the fuel tank is a center wing tank of an airplane.

13. A method as recited in claim 10, further comprising the step of providing the engine bleed air to an ejector venturi to create vacuum as the fluidic motive force.

14. A method as recited in claim 10, further comprising the step of providing the engine bleed air to the catalyst for pre-heating during initial operation.

15. A method as recited in claim 10, wherein steps c) and d) utilize the fluidic motive force.

16. A method as recited in claim 10, further comprising the step of varying the ullage flow based on temperature.

* * * * *